United States Patent [19]

Jansen

[11] Patent Number: 4,468,185
[45] Date of Patent: Aug. 28, 1984

[54] APPARATUS FOR MOLDING A STRAND OF CARAMEL CANDY

[75] Inventor: Helmut Jansen, Geldern, Fed. Rep. of Germany

[73] Assignee: Robert Bosch GmbH, Stuttgart, Fed. Rep. of Germany

[21] Appl. No.: 445,823

[22] Filed: Dec. 1, 1982

[30] Foreign Application Priority Data

Feb. 5, 1982 [DE] Fed. Rep. of Germany ....... 3203938
Sep. 22, 1982 [DE] Fed. Rep. of Germany ....... 3235024

[51] Int. Cl.³ .......................... A23G 3/02; A23G 3/06
[52] U.S. Cl. ................................. 425/133.1; 425/134; 425/141; 425/145; 425/297; 425/308; 425/377; 426/512
[58] Field of Search ..................... 425/131.1, 134, 132, 425/133.1, 145, 142, 296, 297, 308, 377, 141; 426/512

[56] References Cited

U.S. PATENT DOCUMENTS 2,125,729 8/1938 Kretchmer ...................... 425/133.1
2,197,919 4/1940 Bowman .............................. 426/4

FOREIGN PATENT DOCUMENTS 2119323 10/1972 Fed. Rep. of Germany ...... 425/308

*Primary Examiner*—Willard E. Hoag
*Attorney, Agent, or Firm*—Edwin E. Greigg

[57] ABSTRACT

An apparatus for producing edible food products having a filling therein, the filling being introduced into the center of the food product by an injection nozzle that is contiguous with a nozzle from which the food product is discharged. A conveyor having a descending gradient is associated with the nozzles and advances the food product downwardly to a feeder apparatus which severs product to length. A sensor is positioned between the conveyor and the feeder apparatus to control the speed of the feeder apparatus.

6 Claims, 1 Drawing Figure

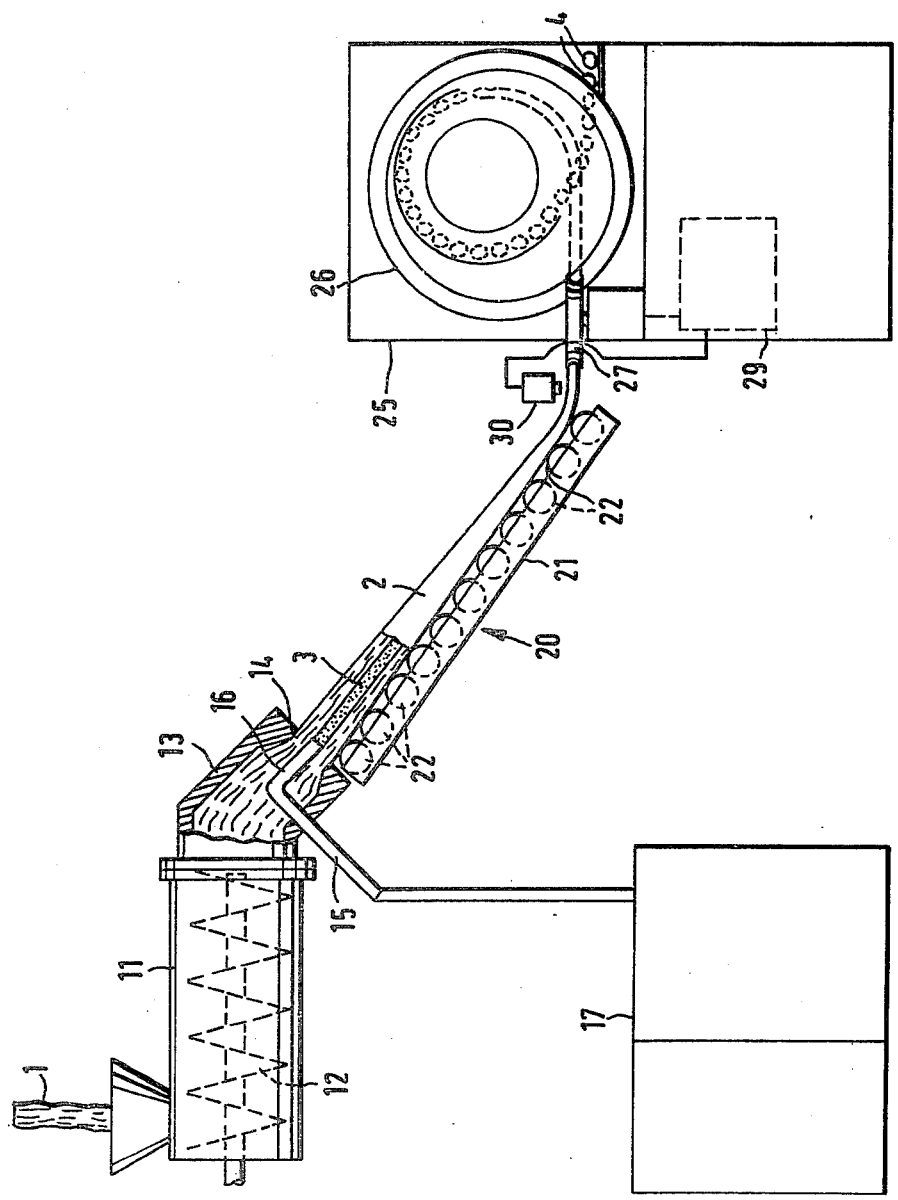

APPARATUS FOR MOLDING A STRAND OF CARAMEL CANDY

BACKGROUND OF THE INVENTION

The invention is based on an apparatus for producing an edible food product. For example, in a heretofore conventional method for molding a filled strand of caramel candy, from which pieces are cut and shaped into the final product the caramel compound, having been cooled to approximately 80°–90° C. after boiling, is rolled into a hollow tube around an injection nozzle for the filling product which is discharged in the form of a tube, the shaper mechanism being equipped with a plurality of cone rollers (German Offenlegungsschrift No. 21 32 206). The thickness of this tube varies widely, depending upon the inflow of caramel compound; accordingly, the tube is rolled to the required thickness on a stretching apparatus having a multiplicity of calibrated roller pairs (German Pat. No. 886,559) before it enters the molding machine. Since the individual segments of the tube tend to back up to a greater or lesser extent in front of the individual pairs of calibrated rollers, depending on the initial thickness of the tube, the filling product does not undergo a uniform distribution among the various segments of the tube. Once the tube has been rolled to its final dimensions, the coating of caramel compound is not of a uniform cross section as it enters the molding machine, nor is the filling uniform at that time, so that the caramels shaped in the molding machine vary greatly from one another in the amount of filling they contain. A method and an apparatus are therefore desired in which a filled tube of caramel compound can be shaped, the caramel coating of which is uniformly thick and has a uniform cross section, so that well-filled, thin-walled caramels can be produced.

OBJECT AND SUMMARY OF THE INVENTION

The method according to the invention has the advantage that a tubular body comprising a coating of candy compound and a filling can be calibrated to the required final dimension in a simple manner by means of stretching; the cross sections of the coating and of the filling are of uniform thickness in a continuously shaped product. The stretching of the product has the further advantage of uniform orientation within the caramel compound, so that the caramels made from it have a particular consistency.

The apparatus disclosed hereinafter is advantageously suitable for performing the method of this invention. It is simple in structure and comprehensible.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing illustrates one exemplary embodiment of the invention in the form of a strand shaping apparatus, seen from the side and partially in section.

DESCRIPTION OF THE PREFERRED EMBODIMENT

The starting material for producing a tube of caramel compound for molding hard caramel candies is a caramel mass of boiled sugar and glucose, having a moisture content of less than 5%. The boiled caramel compound in the form of a strip 1 is delivered to a shaper mechanism, for instance a screw extruder 11. The extruder 11, equipped with one or more feed means 12, is disposed horizontally and has an extrusion head 13 with a suitable tapering nozzle 14, the axis of which is inclined downward by an angle of approximately 45°.

A filling pipe 15 for the viscous material which enters the tubular caramel body protrudes into the extrusion head 13, and the end 16 of the filling pipe is bent at an angle as shown in the drawing and extends coaxially within the nozzle 14. The filling pipe 15 communicates via a line with a tempering and filling apparatus 17 for filling products such as that described, for example, in German Pat. No. 14 82 484.

A guide 20 adjoins the extrusion head 13 of the shaper mechanism at an inclination somewhat less than that of the axis of the nozzle 14. This guide 20, which has a steep gradient, comprises a roller track having a plurality of rollers 22 supported in a carrier frame 21. The rollers 22 are anti-adhesively coated or are made of tetrafluorethylene. They are supported freely rotatably in the carrier frame 21 and their axes of rotation extend transversely relative to the longitudinal axis of the guide 20.

Adjacent to the end of the guide 20 is a molding apparatus 25, for instance such as that described in German Pat. No. 10 53 913, having a molding rotor 26.

A feeding apparatus in the form of a pair of feeder rollers 27 is disposed at the inlet of the molding apparatus 25; these rollers rotate continuously about vertical axes and they are appropriately recessed in a semicircular manner in order to properly shape the end product.

The described apparatus for performing the method for molding a filled strand of caramel compound functions as follows:

Caramel compound made of boiled sugar and glucose is delivered continuously in the form of a strip 1 to the extruder 11. The caramel compound strip 1 is precooled to approximately 80°–90° C. and mixed with other ingredients such as flavorings and the like. The caramel compound is placed under pressure in the extruder 11, so that it leaves the nozzle 14 of the extrusion head 13 in the form of a tubular body 2 having a circular cross section and having a diameter of approximately 30 mm all of which will be understood by reference to the drawing. As a result of the disposition of the end piece 16 of the filling pipe 15 in the nozzle 14, the caramel product 2 which is emitted from the nozzle 14 receives a hollow shape. A viscous filling product 3 which is processed in the tempering and filling apparatus 17 and preheated to a temperature which is only slightly less than that of the caramel compound in the nozzle 14 is injected through the filling pipe 15 into the cavity in the jacket-like product 2.

The product 2 leaving the nozzle 14 and arriving at the guide 20 has a temperature of approximately 80° C. and is highly plastic. The strand 2 moves obliquely downward on the rollers 22 of the guide 20 which has a relatively steep gradient toward the feeder roller pair 27. As a consequence of its own weight and because of the plastic consistency of the hot caramel compound, the caramel product 2 stretches or is drawn along the gradient of the guide 20, causing its diameter to be decreased continuously down to approximately 15 mm. During this process, the wall of the caramel product 2 is thinned as the molecules making up the caramel compound become axially oriented, and the cross section of the filling is reduced somewhat as well. The degree to which the caramel product 2 is filled can be varied within certain limits by increasing or reducing the pressure with which the filling product 3 is pumped into the cavity formed by the nozzle 16 in the product 2.

The product 2 which has been stretched uniformly along the gradient is delivered by the feeder roller pair 27, which may exert a calibrating effect, to the molding rotor 26 of the molding apparatus, where pieces are separated from the product 2 and molded into caramels 4 which comprise the end product which is later packaged.

The output of the extruder 11 and the output of the molding apparatus 25 are matched to one another such that it is not possible for a backup of the product 2 to occur. Preferably, however, the extruder is driven such that its output is constant, and should a slight variation in thickness of the strand 2 occur, the feeding speed of the pair of feeder rollers 27 and the speed of rotation of the molding rotor 26 are adapted via an infinitely variable drive mechanism 29. To this end, a thickness-scanning device 30 is provided at the point where the product 2 leaves its oblique position and moves into the horizontal feeding position of the feeder roller pair 27. The thickness-scanning means 30 measures the thickness of the caramel product 2 at a given time and via an appropriately adapted control means exerts an influence on the drive of the feeder roller pair 27 and of the molding rotor 26.

It is not only the weight of the caramel product 2 itself that contributes to the stretching thereof; the feeder apparatus 27 plays a role as well, depending upon how rapidly the feeder apparatus draws off the segment of the product as it arrives. The stretching of the caramel product 2 is also influenced by the steepness of the gradient of the guide 20, so that the thickness thereof can be calibrated by varying this gradient.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for continuously extruding a food product which is thereafter severed to produce individual edible pieces, comprising a plurality of nozzles, one of said nozzles arranged to control the exterior configuration of said food product and the other of said nozzles arranged to provide an elongated aperture in said food product into which a filling is injected, a conveyor means having a descending gradient, a terminus and a longitudinal extent onto which said food product is fed from said nozzles, a feeder apparatus in proximity to said conveyor means and a molding apparatus arranged to sever said food product into individual edible pieces preparatory for packaging.

2. An apparatus as defined by claim 1, characterized in that said food product is passed in front of a sensor means positioned in proximity to the terminus of said conveyor means, said sensor means arranged to control the travel speed of said feeder apparatus.

3. An apparatus as defined by claim 2 characterized in that said descending gradient of said conveyor means is adjustable.

4. An apparatus as defined by claim 1, characterized in that said conveyor means comprises a roller trackway, and said rollers of said trackway being arranged to rotate freely about axes extending transversely relative to said longitudinal extent of said conveyor means.

5. An apparatus as defined by claim 4, characterized in that said food product is passed in front of a sensor means positioned in proximity to the terminus of said conveyor means, said sensor means arranged to control the travel speed of said feeder apparatus.

6. An apparatus as defined by claim 4 characterized in that said descending gradient of said conveyor means is adjustable.

* * * * *